United States Patent
Son et al.

(10) Patent No.: US 8,259,882 B2
(45) Date of Patent: Sep. 4, 2012

(54) APPARATUS AND METHOD FOR PARALLEL SYMBOL CANCELLATION FOR SPATIAL MULTIPLEXING IN MULTIPLE INPUT MULTIPLE OUTPUT SYSTEM

(75) Inventors: Byung-Jik Son, Seoul (KR); Young-Seok Jung, Suwon-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 828 days.

(21) Appl. No.: 12/273,604

(22) Filed: Nov. 19, 2008

(65) Prior Publication Data
US 2009/0129522 A1    May 21, 2009

(30) Foreign Application Priority Data
Nov. 21, 2007   (KR) .................. 10-2007-0119294

(51) Int. Cl.
*H03D 1/06* (2006.01)
(52) U.S. Cl. .................................................. 375/348
(58) Field of Classification Search .................. 375/148, 375/229, 240, 260, 340, 341, 347, 348
See application file for complete search history.

(56) References Cited

U.S. PATENT DOCUMENTS

| | | | | |
|---|---|---|---|---|
| 7,003,055 | B2 * | 2/2006 | Sexton et al. | 375/341 |
| 7,751,472 | B2 * | 7/2010 | Watanabe | 375/240 |
| 2005/0259771 | A1 * | 11/2005 | Higuchi et al. | 375/347 |
| 2006/0062330 | A1 * | 3/2006 | Seo et al. | 375/320 |
| 2008/0123719 | A1 * | 5/2008 | Lee et al. | 375/148 |
| 2010/0014504 | A1 * | 1/2010 | Sun et al. | 370/345 |

FOREIGN PATENT DOCUMENTS

KR   10-2007-0099950   10/2007

* cited by examiner

*Primary Examiner* — Leon-Viet Nguyen
(74) *Attorney, Agent, or Firm* — Cha & Reiter, LLC (57) ABSTRACT

An apparatus and method for parallel symbol cancellation in a Multiple Input Multiple Output (MIMO) system supporting spatial multiplexing. The method includes selecting one of four quadrants representing all points on a constellation having normalization distribution, selecting a single reference point in the selected quadrant and generating a reference value corresponding to the single reference point, generating addition values for representing other points than the single reference point using a difference of a size of each of the points having the normalization distribution, and summing up the reference value and the addition values. The apparatus includes modules configured for performing the parallel symbol cancellation with reduced complexity.

16 Claims, 4 Drawing Sheets

APPARATUS AND METHOD FOR PARALLEL SYMBOL CANCELLATION FOR SPATIAL MULTIPLEXING IN MULTIPLE INPUT MULTIPLE OUTPUT SYSTEM

CLAIM OF PRIORITY

This application claims priority under 35 U.S.C. §119(a) from a Korean Patent Application filed in the Korean Intellectual Property Office on Nov. 21, 2007 and assigned Serial No. 10-2007-0119294, the contents of which are herein incorporated by reference in its entirety.

BACKGROUND OF THE INVENTION

1. Field of the Invention

The present invention relates to a Multiple Input Multiple Output (MIMO) system supporting a spatial multiplexing scheme. More particularly, the present invention relates to an apparatus and method for parallel symbol cancellation for Maximum Likelihood (ML) detection.

2. Description of the Related Art

In a Multiple Input Multiple Output (MIMO) System, each of the transmitting/receiving ends utilize multiple antennas. The MIMO system advantageously increases a transmission capability when compared with a Single Input Single Output (SISO) system that uses a single transmitting/receiving antenna, particularly when the MIMO system uses a spatial multiplexing scheme for simultaneously transmitting a plurality of signals through a multiple antenna.

Figure 1:
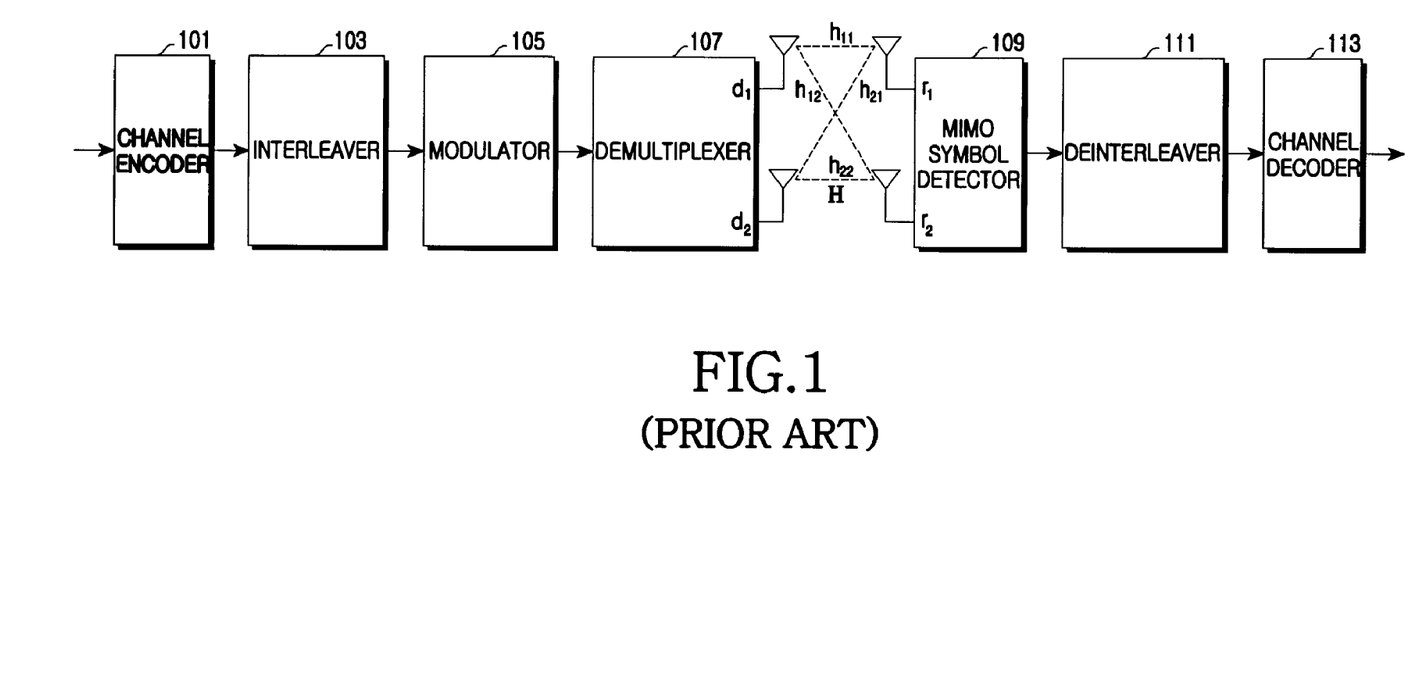
FIG. 1 is a block diagram illustrating a construction of a transmitter and receiver in a conventional Multiple Input Multiple Output (MIMO) system.

As illustrated in FIG. 1, in a MIMO system having two transmitting antennas and two receiving antennas, if the transmitting end transmits a transmitted symbol vector ($x = [d_1 d_2]^T$), the receiving end receives the transmitted signal vector. The received signal vector is expressed in Equation (1) below:

$$r = H \cdot x + n = \begin{bmatrix} h_{11} & h_{21} \\ h_{12} & h_{22} \end{bmatrix} \cdot \begin{bmatrix} d_1 \\ d_2 \end{bmatrix} + \begin{bmatrix} n_1 \\ n_2 \end{bmatrix} \quad (1)$$

In Equation (1), the H represents a channel matrix between transmitting and receiving ends, the x represents the transmitted symbol vector, the n represents an Additive White Gaussian Noise (AWGN) vector, the "$h_{ij}$" represents a channel response between an $i^{th}$ transmit antenna and a $j^{th}$ receive antenna, and the "$d_i$" represents a transmitted symbol from the $i^{th}$ transmit antenna and assumes an M-level Quadrature Amplitude Modulation (M-QAM) signal. Also, the "$n_i$" represents an Additive White Gaussian Noise (AWGN) from an $i^{th}$ receive antenna and has power of $\sigma^2$.

A Maximum Likelihood (ML) detection solution having an optimum performance in a system model given in Equation (1) is expressed in Equation (2) below:

$$\hat{x} = \underset{x \in C}{\mathrm{argmin}} \| r - H \cdot x \|^2 \quad (2)$$

In Equation (2), the "C" denotes a set of all possible candidate symbol vectors for a transmitted symbol vector (x), the r represents a received signal vector, the H represents a channel matrix between transmitting and receiving ends, and the x represents a transmitted symbol vector, An optimal Log Likelihood Ratio (LLR) for a channel decoder is expressed through Equation (2) in Equation (3) below:

$$LLR(b_{1,i}) = \log \left( \frac{\sum_{c \in C_1^+} \sum_{d_2 \in C} \exp\left(-\frac{\|r - h_1 c - h_2 d_2\|^2}{2\sigma^2}\right)}{\sum_{c \in C_1^-} \sum_{d_2 \in C} \exp\left(-\frac{\|r - h_1 c - h_2 d_2\|^2}{2\sigma^2}\right)} \right) \quad (3)$$

$$LLR(b_{2,i}) = \log \left( \frac{\sum_{c \in C_1^+} \sum_{d_1 \in C} \exp\left(-\frac{\|r - h_1 d_1 - h_2 c\|^2}{2\sigma^2}\right)}{\sum_{c \in C_1^-} \sum_{d_1 \in C} \exp\left(-\frac{\|r - h_1 d_1 - h_2 c\|^2}{2\sigma^2}\right)} \right)$$

In Equation (3), the "$b_{j,i}$" represents an $i^{th}$ bit of a transmitted symbol from a $j^{th}$ transmit antenna, the "$C_i^+$" represents a set of $d_j$ having an $i^{th}$ bit of '+1', and the "$C_i^-$" represents a set of $d_j$ having an $i^{th}$ bit of '-1'. Also, the "$h_j$" represents a $j^{th}$ column of a channel matrix (H), and the "$\sigma^2$" represents power.

As expressed in Equation (3), LLR calculation in an ML receiver increases its complexity with exponential function with respect to a modulation order of a data symbol and the number of transmit antennas because there is a need to calculate a Euclidean distance for all possible transmitted symbol combinations. Thus, the ML receiver has a disadvantage that real-time realization is difficult if number of transmit antennas is large or the modulation order of the data symbol is high.

A solution to the aforementioned realization difficulty is a conventional Modified ML (MML) technique. The conventional MML technique cancels from a received signal each of the remaining symbol vectors transmissible from transmitting antennas excepting for a signal transmitted from any one transmit antenna, and then detects the excepted signal through slicing operation, thus being capable of maintaining the same performance as the ML detection technique while reducing a complexity to 1/M. For example, in a 64 Quadrature Amplitude Modulation (64QAM) scheme, the ML technique has to calculate a Euclidean distance for $64^2=4096$ transmitted signal vectors, while the MML technique merely calculates a Euclidean distance only for 2×164=128 transmitted signal vectors. That is, the ML algorithm has to calculate a Euclidean distance for transmitted vectors of $M^{Nt}$ (Nt: number of transmit antennas) number, while the MML algorithm calculates a Euclidean distance for transmitted vectors of $M^{Nt-1}$ number and detects a remaining single symbol through slicing operation.

The conventional MML technique is briefly described below. First, the MML technique cancels from a received signal possible influence of symbols transmitted from a first transmit antenna on all signals ($d_1 = c_m \in C$) as expressed in Equation (4) below:

$$y_m = r - h_1 \cdot c_m = r - \begin{bmatrix} h_{11} \\ h_{12} \end{bmatrix} \cdot c_m, m \in \{1, 2, \dots, M\} \quad (4)$$

In Equation (4), the "r" represents a received signal, the "$h_1$" represents a channel vector between a first transmit antenna and a multiple receive antenna, and the "$c_m$" represents a transmitted symbol vector, "$h_{11}$" represents a channel response between an the first transmit antenna and a first receive antenna, and "$h_{112}$" represents a channel response between an the first transmit antenna and a second receive antenna Then, through a simple slicing operation, the MML technique determines a signal transmitted from a second transmit antenna among received signals from which the influence on the all signals ($d_1 = c_m \epsilon C$) transmissible from the first transmit antenna is canceled. Additionally, the MML technique cancels influence on all signals transmissible from the second transmit antenna in the same manner and then, determines a signal transmitted from the first transmit antenna. After that, the MML technique calculates an LLR for determined transmitted vectors in a method such as Equation (5) below:

$$LLR(b_{1,i}) = \log \left( \frac{\sum_{c \in C_1^+} \exp\left(-\frac{\|r - h_1 c - h_2 d_2(c)\|^2}{2\sigma^2}\right)}{\sum_{c \in C_1^-} \exp\left(-\frac{\|r - h_1 c - h_2 d_2(c)\|^2}{2\sigma^2}\right)} \right) \quad (5)$$

$$LLR(b_{2,i}) = \log \left( \frac{\sum_{c \in C_1^+} \exp\left(-\frac{\|r - h_1 d_1(c) - h_2 c\|^2}{2\sigma^2}\right)}{\sum_{c \in C_1^-} \exp\left(-\frac{\|r - h_1 d_1(c) - h_2 c\|^2}{2\sigma^2}\right)} \right)$$

In Equation (5), the "$b_{j,i}$" represents an $i^{th}$ bit of a symbol transmitted from a $j^{th}$ transmit antenna, the "$C_i^+$" represents a set of $d_j$ having an $i^{th}$ bit of '+1', and the "$C_i^-$" represents a set of $d_j$ having an $i^{th}$ bit of '−1'. Also, the "$h_j$" represents a $j^{th}$ column of a channel matrix (H), and the "$\sigma^2$" represents power.

As such, the MML scheme can greatly reduce the complexity in realization when compared to a conventional scheme. However, as shown in Equations 4 and 5, when using a high modulation order, the MML technique requires a large number of complex multiplication operations and complex subtraction operations and thus, has a problem that a realization complexity is still high.

SUMMARY OF THE INVENTION

The present invention provides an apparatus and method for parallel symbol cancellation in a Multiple Input Multiple Output (MIMO) system supporting spatial multiplexing that provides advantages as to be discussed herein below.

An exemplary aspect of the present invention is to provide an apparatus and method for parallel symbol cancellation with a low complexity in a MIMO system supporting spatial multiplexing.

A further exemplary aspect of the present invention is to provide an apparatus and method for parallel symbol cancellation, for efficiently processing complex multiplication and subtraction operations of a Modified Maximum Likelihood (MML) algorithm in a MIMO system.

Yet another exemplary aspect of the present invention is to provide an apparatus and method for, upon execution of an MML algorithm, reducing an operation amount of a vector with normalization distribution using a common reference value in a MIMO system.

The above exemplary aspects are achieved by providing an apparatus and method for parallel symbol cancellation in a MIMO system supporting spatial multiplexing.

An exemplary aspect of the present invention reduces a complexity of an operation necessary for the parallel symbol cancellation by exchanging a sequence of a complex summation using a feature of a value having a normalization distribution such as a constellation.

According to an exemplary method of the present invention, a parallel symbol cancellation method for canceling possible influence of symbols transmitted from a single transmit antenna on all signals from a received signal in a Multiple Input Multiple Output (MIMO) system supporting spatial multiplexing is provided. The method may include, for example, selecting one of (four) quadrants representing all points on a constellation having normalization distribution, selecting a single reference point in the selected quadrant and generating a reference value corresponding to the single reference point, generating addition values for representing points other than the single reference point using a difference of a size of each of the points having the normalization distribution, and summing up the reference value and the addition values.

According to another exemplary aspect of the present invention, a parallel symbol cancellation apparatus for canceling possible influence of symbols transmitted from a single transmit antenna on all signals from a received signal in a Multiple Input Multiple Output (MIMO) system supporting spatial multiplexing is provided. The apparatus includes a quadrant selector, a reference value generator, an addition value generator, and a summation unit. The quadrant selector selects one of four quadrants representing all points on a constellation having normalization distribution. The reference value generator selects a single reference point in the selected quadrant and generates a reference value corresponding to the single reference point. The addition value generator generates addition values for representing points other than the single reference point by using a size difference of each of the points having the normalization distribution. The summation unit sums up the reference value and the addition values.

BRIEF DESCRIPTION OF THE DRAWINGS

The above features and advantages of the present invention will become more apparent from the following detailed description when taken in conjunction with the accompanying drawings in which.

DETAILED DESCRIPTION

Now, exemplary embodiments of the present invention will be described herein below with reference to the accompanying drawings. For the purposes of clarity and simplicity, well-known functions or constructions may not described in detail when their inclusion would obscure appreciation of the invention by a person of ordinary skill in the art with unnecessary detail.

Exemplary descriptions for a method and apparatus for, upon Maximum Likelihood (ML) detection, canceling a parallel symbol using a common reference value of a vector having normalization distribution in a Multiple Input Multiple Output (MIMO) system supporting a spatial multiplexing scheme according to an exemplary embodiment of the present invention are described herein below. It is to be understood that the exemplary descriptions are for purposes of illustration and not for limitation. Thus, a person of ordinary skill in the art should appreciate that the examples provided herein can have various substitutions and modifications. An exemplary embodiment of the present invention describes, for example, a 64 Quadrature Amplitude Modulation (64QAM) scheme below, and is also applicable to other order modulation schemes and the appended claims are not strictly limited in scope to the examples described herein.

As previously expressed in Equation (4), an operation for canceling a parallel symbol according to the conventional art is comprised of a complex multiplication operation between any channel value (h) and a transmitted symbol vector ($c_m$) having normalization distribution and a complex subtraction operation between the complex multiplication result and any received signal value (r). However, according to an exemplary embodiment of the present invention described herein below, a method for reducing a realization complexity modifies an operation for canceling a parallel symbol as in Equation (4) into a complex summation operation.

More particularly, an exemplary embodiment of the present invention reduces a complexity of an operation necessary for the parallel symbol cancellation by exchanging a sequence of a complex summation using a description of a value having a normalization distribution, such as a constellation. The feature of the value having the normalization distribution such as a constellation is described below. All points on the constellation have a difference of a predetermined size with respect to a real axis and an imaginary axis and thus, can be expressed by adding a predetermined value to a single point on the constellation.

Figure 4:
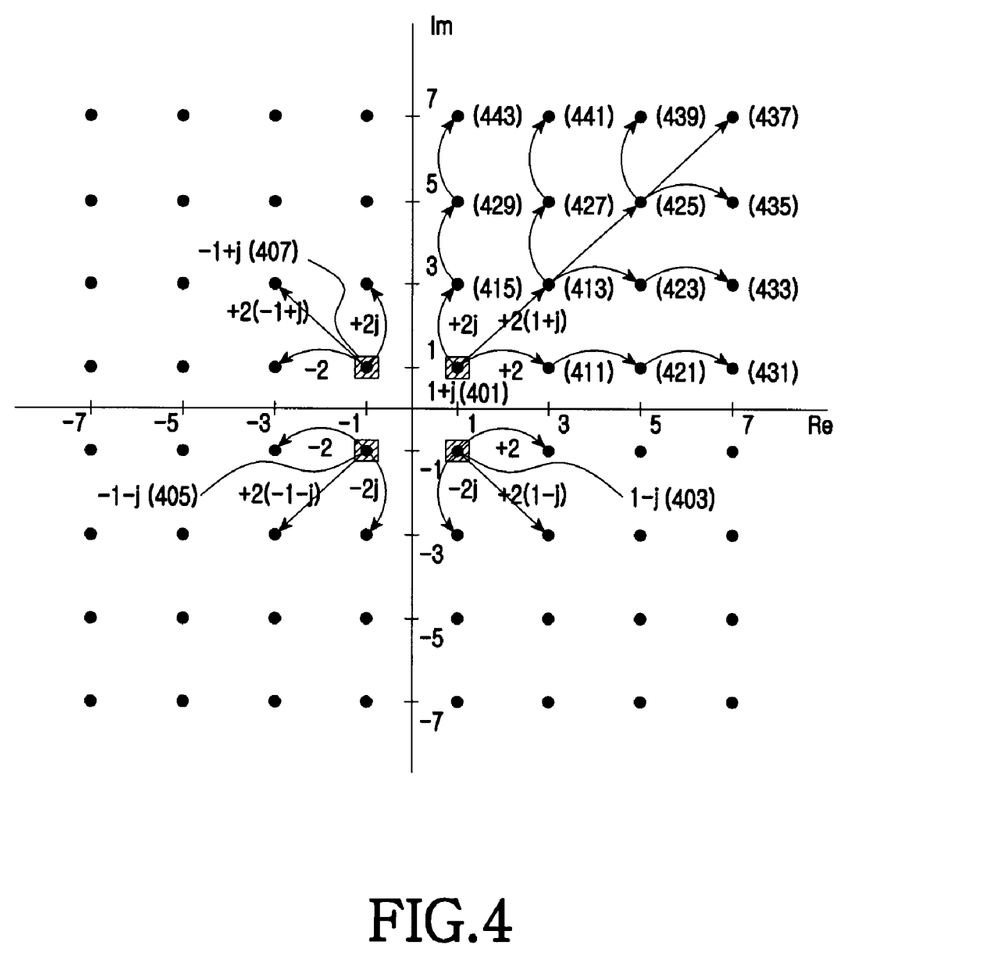
FIG. 4 is a diagram illustrating a method for canceling a parallel symbol on the basis of a 64 Quadrature Amplitude Modulation (64QAM) constellation in a receiver of a MIMO system according to an exemplary embodiment of the present invention.

For example, in FIG. 4 illustrating a 64QAM constellation, all points of a first quadrant of the constellation can be expressed by adding "2" or "2j" to a single point (1+j) 401 on the first quadrant. This can be also applied to a second quadrant, a third quadrant, and a fourth quadrant in the same manner. That is, all points can be expressed by adding "±2" or "±2j" to a single point (1−j, −1−j, or −1+j) 403, 405, or 407 within a corresponding quadrant.

In general, a complex summation can, for example, comprise an operation such as in, for example, Equation (4), (5), (6) (7), (8) and (9) expressed herein.

According to the above description, a complex multiplication between any complex value and any one point on a constellation can be modified into a form of a complex summation. For example, a complex multiplication between any complex value (X+jY) and a single point (5+3j) 423 on a constellation can be modified into a form of a complex summation as expressed in Equation (6) below:

$$(X+jY)(5+3j) = (X+jY)(1+j) + 2(X+jY)(1+j) + 2(X+jY) \quad (6)$$

As expressed in Equation (6), a complex multiplication between any complex value (X+jY) and a single point (5+3j) on a constellation is modified into a complex summation between a complex multiplication between "X+jY" and "1+j" and a multiple operation of the complex value (X+jY) by "±2" or "±2j". The complex multiplication between the any complex value "X+jY" and the "1+j" can be realized in a summation and subtraction form, and the multiple operation by "±2" or "±2j" can be substituted with a bit shift logic operation.

Accordingly, if using a feature of a constellation having normalization distribution as above, a complex multiplication between any channel value (h) and a transmitted symbol vector value ($c_m$) having normalization vector is expressed as a complex summation between a reference value ($h \cdot c_1$) and an addition value ($\Delta_m$) in Equation (7) below:

$$hc_m = h \cdot c_1 + \Delta_m \quad (7)$$

In Equation 7, the "$c_1$" is a basic value for generating a reference value at each quadrant and has a value of "1+j", "1−j", "−1j", and "−1+j" depending on each quadrant, and the "$\Delta_m$" represents a difference value between the basic value and each point of on a constellation.

Thus, an operation for parallel symbol cancellation given in Equation (4) is expressed using Equation (7) in Equation (8) below:

$$
\begin{aligned}
y_m &= (r - h \cdot c_1) + \Delta_m \\
\Rightarrow y_1 &= (r - h \cdot c_1) + \Delta_1 \\
y_2 &= (r - h \cdot c_1) + \Delta_2 \\
y_m &= (r - h \cdot c_1) + \Delta_m
\end{aligned}
\quad (8)
$$

where, ($r - h \cdot c_1$): reference value, $\Delta_m$: addition value, r: received signal, h: channel value, and $c_1$: single reference point in selected quadrant.

In Equation (8), according to the conventional art, a complex subtraction operation between any value (r) and a complex multiplication between any channel value (h) and a value ($c_m$) having normalization distribution can be modified into a complex summation operation between a common value ($r - h \cdot c_1$) and an addition value ($\Delta_m$).

In other words, the conventional art requires performing the complex multiplication operation at "m" times between the any value (h) and the value ($c_m$) having the normalization distribution and again perform the complex subtraction operation at "m" times between the complex multiplication result and any value (r).

Unlike the conventional art, when performing an operation of Equation (8), an exemplary embodiment of the present invention performs one-time summation and subtraction to obtain a common value ($r - h \cdot c_1$) and then performs a summation operation at "m" times between the summation and subtraction result and an addition value ($\Delta m$), thus greatly reducing an operation complexity.

Thus, an apparatus and method for canceling a parallel symbol as given in Equation (8) are described below.

Figure 2:
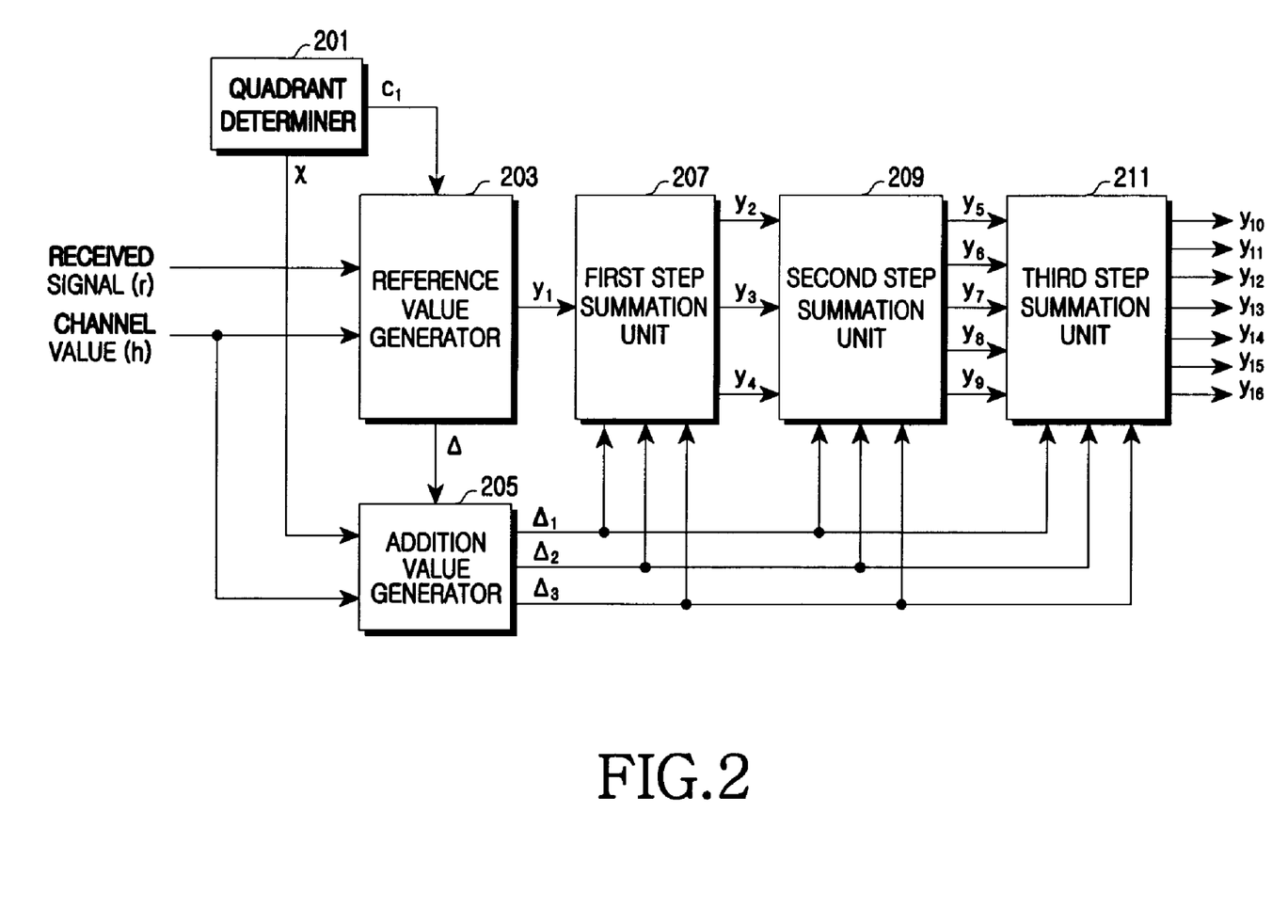
FIG. 2 is a block diagram illustrating a construction of an apparatus for parallel symbol cancellation in a receiver of a MIMO system according to an exemplary embodiment of the present invention.

FIG. 2 is a block diagram illustrating an exemplary construction of an apparatus for parallel symbol cancellation in a receiver of a MIMO system according to an exemplary embodiment of the present invention.

As illustrated in the example shown FIG. 2, the receiver includes a quadrant determiner 201, a reference value generator 203, an addition value generator 205, a first step summation unit 207, a second step summation unit 209, and a third step summation unit 211.

The quadrant determiner 201 selects one of four quadrants (illustrated in FIG. 4) and provides a basic value ($c_1$) corresponding to the selected quadrant to the reference value generator 203 to generate a reference value and addition value by quadrant. For example, the quadrant determiner 201 provides a basic value for a first quadrant as "1+j", provides a basic value for a second quadrant as "1−j", provides a basic value for a third quadrant as "−1−j", and provides a basic value for a fourth quadrant as "−1+j".

The reference value generator 203 in this example typically receives an identification of a selected quadrant and its corresponding basic value from the quadrant determiner 201, and then generates a reference value for the selected quadrant based on the corresponding basic value that has been received. In more detail, as illustrated in FIG. 4, the reference value generator 203 generates a reference value for a selected first quadrant as (r−h·(1+j)) 401, generates a reference value for a selected second quadrant as (r−h·(1−j)) 403, generates a reference value for a selected third quadrant as (r−h·(−1−j)) 405, and generates a reference value for a selected fourth quadrant as (r−h·(−1+j)) 407. The reference value for each quadrant can be calculated, for example, through summation and subtraction.

The addition value generator 205 generates three addition values for the selected quadrant and provides the generated addition values to the first, second, and third step summation units 207, 209, and 211. As illustrated in FIG. 4, the addition value generator 205 generates addition values for a first quadrant as "2·h·(1+j)", "2·h", and "2·j·h", generates addition values for a second quadrant as "2·h·(1−j)", "2·h", and "−2·j·h", generates addition values for a third quadrant as "2·h·(−1−j)", "−2·h", and "−2·j·h", and generates addition values for a fourth quadrant as "2·h·(−1+j)", "−2·h", and "2·j·h". Each addition value calculation can be realized by bit shift logic operation and code conversion.

The first step summation unit 207 in this example typically calculates the first step summation values by summing up a reference value generated for a corresponding quadrant in the reference value generator 203, and the three addition values generated in the addition value generator 205.

At this time, the first step summation unit 207 calculates three first step summation values by summing up the reference value and the three addition values.

For example, referring to FIG. 4, if a first quadrant is selected, the first step summation unit 207 calculates values for three points 411, 413, and 415 on the constellation by receiving a reference value (r−h·(1+j)) 401 from the reference value generator 203, receiving three addition values "2·h·(1+j)", "2·h", and "2·j·h" from the addition value generator 205, and summing up the reference value and the three addition values, respectively.

The second step summation unit 209 in this example typically calculates second step summation values by summing up the three first step summation values calculated in the first step summation unit 207 and the three addition values generated in the addition value generator 205. At this time, the second step summation unit 209 calculates five second step summation values by summing up the three first step addition values and the three addition values.

For example, referring to FIG. 4, if a first quadrant is selected, the second step summation unit 209 calculates values for five points 421, 423, 425, 427, and 429 on the constellation by receiving values for three points 411, 413, and 415 from the first step summation unit 207, receiving the three addition values "2·h·(1+j)", "2·h", and "2·j·h" from the addition value generator 205, and performing a summation operation.

The third step summation unit 211 in this example typically calculates third step summation values by summing up the five second step summation values calculated in the second step summation unit 209 and the three addition values generated in the addition value generator 205. At this time, the third step summation unit 211 calculates seven third step summation values by summing up the five second step addition values and the three addition values. For example, referring to FIG. 4, if a first quadrant is selected, the third step summation unit 211 calculates values for seven points 431, 433, 435, 437, 439, 441, and 443 on the constellation by receiving values for five points 421, 423, 425, 427, and 429 from the second step summation unit 209, receiving the three addition values "2·h·(1+j)", "2·h", and "2·j·h" from the addition value generator 205, and performing a summation operation.

Figure 3:
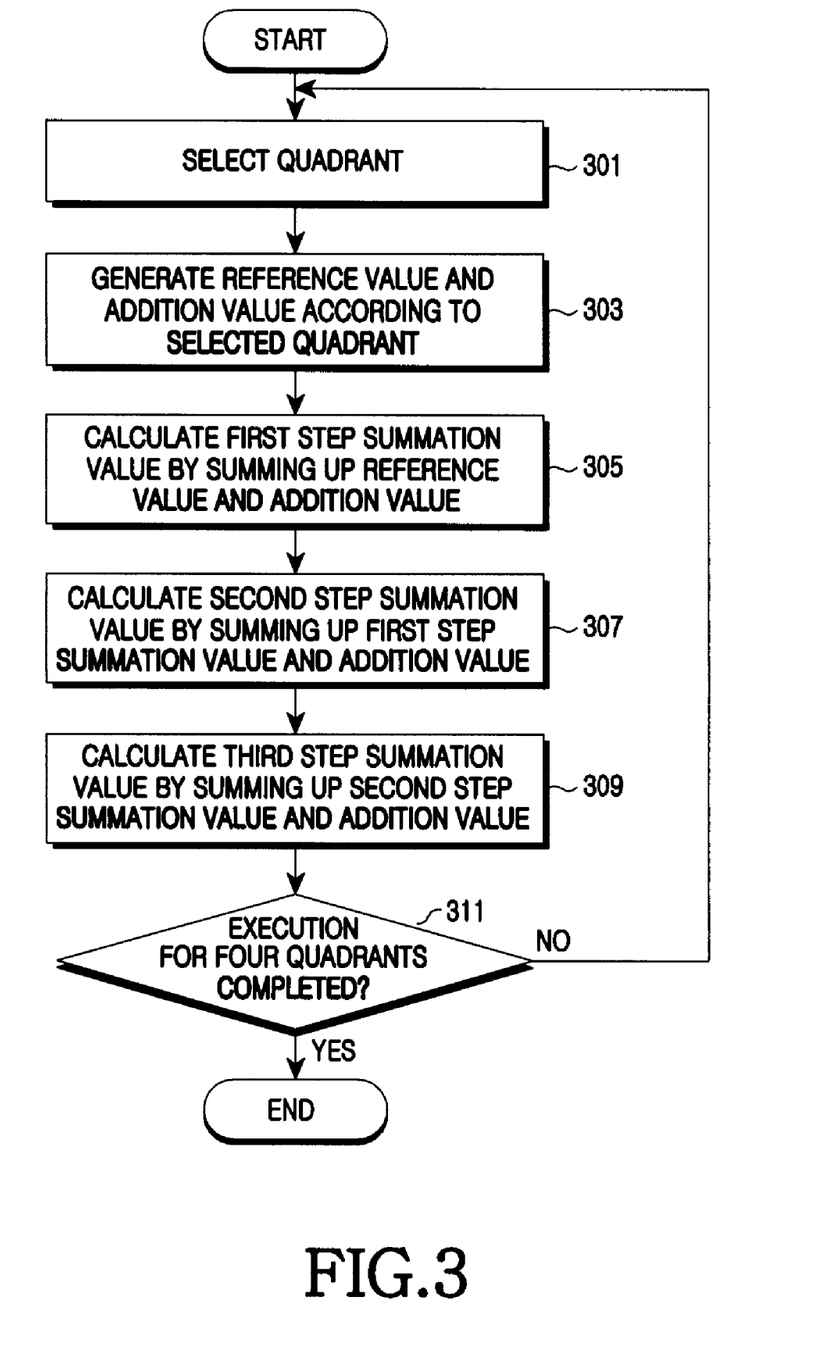
FIG. 3 is a flow diagram illustrating exemplary steps of a process for parallel symbol cancellation in a receiver of a MIMO system according to an exemplary embodiment of the present invention.

FIG. 3 is a flow diagram illustrating exemplary steps of a process for parallel symbol cancellation in a receiver of a MIMO system according to an exemplary embodiment of the present invention.

Referring to FIG. 3, in step 301, the receiver selects one quadrant and, in step 303, generates a reference value and addition values for the selected quadrant.

For an example of generating reference values for the quadrants, as illustrated in FIG. 4, the receiver generates a reference value for a selected first quadrant as (r−h·(1+j)) 401, generates a reference value for a selected second quadrant as (r−h·(1−j)) 403, generates a reference value for a selected third quadrant as (r−h·(−1−j)) 405, and generates a reference value for a selected fourth quadrant as (r−h·(−1+j)) 407. Also, the receiver generates addition values for the first quadrant as "2·h·(1+j)", "2·h", and "2·j·h", generates addition values for the second quadrant as "2·h·(1−j)", "2·h", and "−2·j·h", generates addition values for the third quadrant as "2·h·(−1−j)", "−2·h", and "−2·j·h", and generates addition values for the fourth quadrant as "2·h·(−1+j)", "−2·h", and "2·j·h".

Then, in step 305, the receiver calculates first step summation values by summing up the generated reference value and addition values. For example, referring to FIG. 4, if a first quadrant is selected, the reference value is equal to (r−h·(1+j)) 401 and the addition values are equal to "2·h·(1+j)", "2·h", and "2·j·h". Thus, the receiver calculates values for three points 411, 413, and 415 on the constellation by summing up the reference value and the three addition values, respectively.

Then, in step 307, the receiver calculates second step summation values by again summing up the first step summation values and the addition values. For example, referring to FIG. 4, if a first quadrant is selected, the receiver calculates values for five points 421, 423, 425, 427, and 429 on the constellation by summing up the first step summation values (i.e., the values for the three points 411, 413, and 415) and the addition values (i.e., 2·h·(1+j), 2·h, and 2·j·h).

After calculating the second step summation values, in step 309, the receiver calculates third step summation values by summing up the second step summation values and the addition values. For example, referring to FIG. 4, if a first quadrant is selected, the receiver calculates values for seven points 431, 433, 435, 437, 439, 441, and 443 on the constellation by summing up the second step summation values (i.e., the values for the five points 421, 423, 425, 427, and 429) and the addition values (i.e., 2·h·(1+j), 2·h, and 2·j·h).

Still referring to FIG. 3, in step 311, the receiver determines if it has completes a parallel symbol cancellation operation for four quadrants. Upon not completion, the receiver returns to step 301 and performs its subsequent steps. Upon completion, the receiver terminates the process according to an exemplary embodiment of the present invention.

As described above, and shown in FIGS. 5 and 6, an exemplary embodiment of the present invention can reduce an operation complexity by modifying a complex multiplication between any channel value (h) and a transmitted symbol vector value ($c_m$) having normalization distribution into a complex summation between a reference value ($h \cdot c_1$) and an addition value ($\Delta_m$) and canceling a parallel symbol.

Table 1 shows an operation amount used for canceling a parallel symbol for four quadrants according to the conventional art and an exemplary embodiment of the present invention.

TABLE 1

| | $y_m = r - h \cdot c_m, m \in \{1, 2, \ldots, 64\}$ | | | | Reduced operation amount |
|---|---|---|---|---|---|
| | Conventional Art | | Present Invention | | |
| | $h \cdot c_m$ | $r - h \cdot c_m$ | $y_1 = r - h \cdot c_1$ | $y_m = y_1 + \Delta_m$ | |
| 64QAM | 64 | 64 | 8 | 60 | 47% |
| | 128 | | | 68 | |
| 16QAM | 16 | 16 | 8 | 12 | 38% |
| | 32 | | | 20 | |
| QPSK | 4 | 4 | 8 | 0 | 0% |
| | 8 | | | 8 | |

Table 2 shows an operation amount used for canceling a parallel symbol for one quadrant according to the conventional art and an exemplary embodiment of the present invention.

TABLE 2

| | $y_m = r - h \cdot c_m, m \in \{1, 2, \ldots, 64\}$ | | | | Reduced operation amount |
|---|---|---|---|---|---|
| | Conventional Art | | Present Invention | | |
| | $h \cdot c_m$ | $r - h \cdot c_m$ | $y_1 = r - h \cdot c_1$ | $y_m = y_1 + \Delta_m$ | |
| 64QAM | 16 | 16 | 2 | 15 | 47% |
| | 32 | | | 17 | |
| 16QAM | 4 | 4 | 2 | 3 | 38% |
| | 8 | | | 5 | |
| QPSK | 1 | 1 | 2 | 0 | 0% |
| | 2 | | | 8 | |

As shown in Tables 1 and 2, the conventional art requires performing the complex multiplication operation at "m" times between the any value (h) and the value ($c_m$) having the normalization distribution and again perform the complex subtraction operation at "m" times between the complex multiplication result and any value (r). However, when performing an operation of Equation 8, an exemplary embodiment of the present invention performs summation and subtraction each one time to obtain a common value ($r - h \cdot c_1$) and then performs a summation operation at "m−1" times between the summation and subtraction result and an addition value ($\Delta_m$), thus greatly reducing an operation complexity.

In the Tables 1 and 2, a 64QAM modulation scheme is exemplified and, upon parallel symbol cancellation, three-step summation operation is totally performed. However, if other modulation schemes are performed, the summation operation will be different. For example, if using a Quadrature Phase Shift Keying (QPSK) modulation scheme, an exemplary embodiment of the present invention can cancel a parallel symbol by merely performing a one-step summation operation and, if using a 16QAM modulation scheme, can cancel a parallel symbol by merely performing a two-step summation operation.

Also, another exemplary embodiment of the present invention cancels a parallel symbol by modifying a parallel symbol cancellation operation of Equation (4) into an operation of Equation (8), but is also applicable to generation of an LLR expressed in Equation (5).

An exemplary embodiment of the present invention has an effect of reducing an operation amount by, upon ML detection, performing parallel symbol cancellation using a common reference value of a vector having normalization distribution in a MIMO system supporting a spatial multiplexing scheme.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A parallel symbol cancellation method for canceling an influence of symbols transmitted from a single transmit antenna on signals from a received signal in a Multiple Input Multiple Output (MIMO) system that supports spatial multiplexing, the method comprising:
    (a) selecting one quadrant among four quadrants including all points on a constellation having normalization distribution;
    (b) selecting a single reference point in the selected quadrant and generating a reference value corresponding to the single reference point;
    (c) generating addition values for representing points other than the single reference point in the selected quadrant using distance to the reference point from three points that are closest to the reference point within the selected quadrant; and
    (d) summing up the reference value and the addition values; wherein summing up the reference value and the addition values are expressed below:

$$y_m = (r - h \cdot c_1) + \Delta_m$$

where, ($r - h \cdot c_1$): reference value, $\Delta_m$: addition value, r: received signal, h: channel value, and $c_1$: single reference point in the selected quadrant.

2. The method of claim 1, wherein the reference value generated for: a selected first quadrant is ($r - h \cdot (1+j)$); a selected second quadrant is ($r - h \cdot (1-j)$); a selected third quadrant is ($r - h \cdot (-1-j)$), and a selected fourth quadrant is ($r - h \cdot (-1+j)$).

3. The method of claim 1, wherein the generating of the reference value in step (b) comprises:
    (i) performing a complex summation operation between the single reference point and any channel value; and
    (ii) performing a complex subtraction operation between a received signal and the complex summation result from (i).

4. The method of claim 1, further comprising:
    (i) summing up the reference value and the addition values according to a modulation scheme supported in the MIMO system;
    (ii) summing up the summation result and the addition values.

5. The method of claim 4, wherein, when the MIMO system supports Quadrature Phase Shift Keying (QPSK), and a parallel symbol is canceled by summing up the reference value and the addition values in (i).

6. The method of claim 4, wherein, when the system supports 16 Quadrature Amplitude Modulation (16QAM), a parallel symbol is canceled by performing a first step summation operation for summing up the reference value and the addition values and then performing a second step summation operation for summing up the first step summation result and the addition values.

7. The method of claim 4, wherein, when the system supports 64QAM, a parallel symbol is canceled by performing a first step summation operation for summing up the reference value and the addition values, performing a second step summation operation for again summing up the first step summation result and the addition values, and then performing a third step summation operation for again summing up the second step summation result and the addition values.

8. A parallel symbol cancellation apparatus for canceling influence of symbols transmitted from a single transmit antenna on signals from a received signal in a Multiple Input Multiple Output (MIMO) system supporting spatial multiplexing, the apparatus comprising:
a quadrant selector for selecting one quadrant among four quadrants including all points on a constellation having normalization distribution;
a reference value generator for selecting a single reference point in the selected quadrant and for generating a reference value corresponding to the single reference point;
an addition value generator for generating addition values for representing points other than the single reference point in the selected quadrant using distance to the reference point from three points that are closest to the reference point within the selected quadrant; and
a summation unit for summing up the reference value for the single reference point and the addition values, wherein the summation unit sums up the reference value, and the addition values as expressed below:

$$y_m = (r - h \cdot c_1) + \Delta_m$$

where, $(r-h \cdot c_1)$: reference value, $\Delta_m$: addition value, r: received signal, h: channel value, and $c_1$: single reference point in selected quadrant.

9. The apparatus of claim 8, wherein the reference value generator generates the reference value by performing a complex summation operation between the single reference point and any channel value and by then performing a complex subtraction operation between a received signal and the complex summation result.

10. The apparatus of claim 8, wherein, according to a modulation scheme supported in the system, a parallel symbol is canceled by summing up the reference value and the addition values and then, summing up the summation result and the addition values.

11. The apparatus of claim 10, further comprising a first step summation unit for, when the system supports Quadrature Phase Shift Keying (QPSK), summing up the reference value and the addition values.

12. The apparatus of claim 10, further comprising:
a first step summation unit for, when the system supports 16 Quadrature Amplitude Modulation (16QAM), summing up the reference value and the addition values; and
a second step summation unit for summing up the first step summation result and the addition values.

13. The apparatus of claim 10, further comprising:
a first step summation unit for, when the system supports 64QAM, summing up the reference value and the addition values;
a second step summation unit for summing up the first step summation result and the addition values; and
a third step summation unit for summing up the second step summation result and the addition values.

14. The apparatus of claim 10, further comprising:
a first step summation unit for summing up the reference value and the addition values;
a second step summation unit for summing up the first step summation result and the addition values; and
a third step summation unit for summing up the second step summation result and the addition values.

15. The apparatus according to claim 9, wherein the reference value generator generates a reference value for a selected first quadrant as $(r-h \cdot (1+j))$, generates a reference value for a selected second quadrant as $(r-h \cdot (1-j))$, generates a reference value for a selected third quadrant as $(r-h \cdot (-1-j))$, and generates a reference value for a selected fourth quadrant as $(r-h \cdot (-1+j))$.

16. A parallel symbol cancellation apparatus for canceling an influence of symbols transmitted from a single transmit antenna on signals from a received signal in a Multiple Input Multiple Output (MIMO) system that supports spatial multiplexing, the apparatus comprising:
(a) means for selecting a single reference point in a selected quadrant and generating a reference value corresponding to the single reference point wherein a reference value for a selected first quadrant as $(r-h \cdot (1+j))$, generates a reference value for a selected second quadrant as $(r-h \cdot (1-j))$, generates a reference value for a selected third quadrant as $(r-h \cdot (-1-j))$, and generates a reference value for a selected fourth quadrant as $(r-h \cdot (-1+j))$;
(b) means for generating addition values for representing points other than the single reference point in the selected quadrant using distance to the reference point from three points that are closest to the reference point within the selected quadrant; and
(c) means for summing up the reference value and the addition values.

* * * * *